United States Patent Office 2,854,454
Patented Sept. 30, 1958

2,854,454
RESCINNAMINE

Paul R. Ulshafer, Summit, N. J.

No Drawing. Application February 19, 1954
Serial No. 411,541

3 Claims. (Cl. 260—287)

The present invention relates to new compounds and more particularly to trialkoxy substituted cinnamic acid esters of alkyl reserpates, for example, 3,4,5-trimethoxycinnamate of methyl reserpate. The novel compounds, and especially the 3,4,5-trimethoxycinnamate of methyl reserpate, are useful as hypotensive and sedative agents.

Reserpic acid has already been described in the literature as well as the esters of reserpic acid in which the carboxyl group present in reserpic acid is esterified, e. g., methyl reserpate. It has been found, according to the present invention, that when a reserpic acid ester with a free hydroxyl group is esterified with a trialkoxy cinnamic acid the resulting reserpate in which the hydroxyl group is esterified with the trialkoxy cinnamic acid exhibits hypotensive and sedative action.

The new esters can be prepared by the usual esterification methods. In general, reserpic acid in which the carboxyl group is esterified is reacted with an esterifying derivative of a trialkoxy cinnamic acid. According to one procedure an ester of reserpic acid in which the carboxyl group is esterified is reacted with a trialkoxy cinnamoyl halide. According to another procedure the esterifying agent in the form of the anhydride may be employed. According to the preferred procedure the reserpate containing the free hydroxyl group is esterified with the trialkoxy cinnamoyl halide. Thus, for example, 3,4,5-trimethoxycinnamate of methyl reserpate is readily prepared by reacting methyl reserpate with 3,4,5-trimethoxycinnamoyl chloride. When the acyl halide of the trialkoxy cinnamic acid is employed as the esterifying agent it is preferred to carry out the reaction in the presence of an acid binding agent such, for example, as pyridine, calcium carbonate, and the like.

The following examples will serve to illustrate the invention: In the examples the relationship of parts by weight to parts by volume are the same as the gram to the milliliter.

Example 1

To a solution of 0.80 part by weight of methyl reserpate in 10 parts by volume of dry distilled pyridine at 10–15° C. were added in portions during 20 minutes with stirring and external cooling 1.1 part by weight of 3,4,5-trimethoxycinnamoyl chloride. The reaction was carried out under nitrogen. After standing at room temperature for 65 hours the pyridine was removed under reduced pressure and at a temperature at 50–60° C. A brown solid froth-like material was obtained which was chromatographed on 30 parts by weight of alumina (activity II–III). The fractions eluted with benzene-acetone mixtures, on crystallization from benzene yielded 3,4,5-trimethoxycinnamate of methyl reserpate in the form of needles, which on recrystallation from methanol melted at 232–234° C. *Analysis.*—Calcd. for $C_{35}H_{42}O_9N_2$: C=66.23; H=6.67; N=4.41. Found: C=66.15; H=6.76; N=4.63. The compound in a mineral oil (Nujol) mull exhibits strong and characteristic absorption bands in the infra-red region of the spectrum at the following frequencies expressed in reciprocal centimeters: 1130, 1141, 1152, 1173, 1266, 1276, 1507, 1587, 1633, 1712, 1732, 3385.

Example 2

To 0.80 part by weight of methyl reserpate and 1.0 part by weight of 3,4,5-trimethoxycinnamoyl chloride were added 10 parts by volume of dry distilled pyridine. The mixture was stirred and cooled until a nearly complete light amber-colored solution was obtained. An additional 5 parts by volume of pyridine were added and the reaction mixture cooled to 5° C. After 15 minutes a crystalline precipitate was obtained and 5 parts by volume of benzene were added and the reaction mixture kept at 5° C. for 65 hours. The resulting solution was evaporated under vacuum to a viscous syrup. When small portions of toluene were added and evaporated to complete removal of the pyridine, the resulting amber-colored solid froth was extracted with ether and the ether insoluble portion was taken up in methylene chloride, washed with water, and dried over sodium sulfate. It was then concentrated under vacuum whereupon the residue obtained was chromatographed on 35 parts by weight of alumina (activity II–III). Fractions eluted with benzene-acetone mixtures and with acetone containing small amounts of methanol gave on crystallization from benzene 3,4,5-trimethoxycinnamate of methyl reserpate.

Instead of employing 3,4,5-trimethoxycinnamoyl chloride in the above examples, it will be understood that other halides such as the 3,4,5-trimethoxycinnamoyl bromide, or the anhydride can be employed as well as other trialkoxycinnamoyl halides and anhydrides. Other esters than methyl reserpate can also be esterified in the same manner, e. g., ethyl reserpate and other alkyl reserpates.

The 3,4,5-trimethoxycinnamoyl chloride employed in Examples 1 and 2 can be prepared in the following manner:

4.0 grams of 3,4,5-trimethoxycinnamic acid, M. P. 125.5–127° C. was refluxed for 35 minutes under anhydrous conditions with 6.0 parts by volume of redistilled thionyl chloride. The excess thionyl chloride was removed under vacuum and by distilling from the residue two portions of dry benzene. The crystalline residue was crystallized twice from hexane-ether to yield 3,4,5-trimethoxycinnamoyl chloride which was obtained in the form of bright yellow prisms, M. P. 95–96° C. If instead of thionyl chloride there is employed thionyl bromide, the 3,4,5-trimethoxycinnamoyl bromide can be produced.

I claim:

1. The process for the preparation of the 3,4,5-trimethoxycinnamic acid ester of methyl reserpate, which comprises treating 3,4,5-trimethoxycinnamoyl chloride with methyl reserpate in the presence of anhydrous pyridine.

2. A crystalline product of manufacture consisting of 3,4,5-trimethoxycinnamic acid ester of methyl reserpate.

3. The process for the preparation of the 3,4,5-trilower alkoxy-cinnamic acid ester of methyl reserpate which comprises treating a member of the group consisting of 3,4,5-tri-lower alkoxy-cinnamoyl chloride and 3,4,5-tri-lower alkoxycinnamoyl bromide with methyl reserpate in the presence of an acid binding agent.

References Cited in the file of this patent

UNITED STATES PATENTS 2,752,351    Schlittler _____ June 26, 1956

OTHER REFERENCES

Dutt et al.: Ind. J. Pharm., vol. 9, pages 54–57 (1947), as abstracted in Chem. Abstr., vol. 42, col. 2729 (1948).

Gupta et al.: Ind. J. Med. Research, vol. 32, pp. 183–8 (1944), as abstracted in vol. 40, col. 4148 (1946).

Klohs et al.: J. Am. Chem. Soc., vol. 76, page 2843 (May 20, 1954).

Haack et al.: Die Naturwissenschaften, vol. 41, No. 9, pages 214 and 215 (1954).